United States Patent [19]

Liu et al.

[11] Patent Number: 5,280,817
[45] Date of Patent: Jan. 25, 1994

[54] RADIAL PNEUMATIC TIRE HAVING CONTOURED ZONES IN THE SIDEWALLS

[75] Inventors: Hon H. Liu, Akron; Loren K. Miller, Kent; Amit Prakash, Hudson; John G. Morgan, North Canton, all of Ohio

[73] Assignee: The Goodyear Tire & Rubber Company, Akron, Ohio

[21] Appl. No.: 772,198

[22] Filed: Oct. 7, 1991

[51] Int. Cl.$^5$ ............................................. B60C 3/00
[52] U.S. Cl. ..................................... 152/454; 152/510; 152/555
[58] Field of Search ............... 152/454, 510, 516, 517, 152/522, 555

[56] References Cited

U.S. PATENT DOCUMENTS

| | | | |
|---|---|---|---|
| 3,935,892 | 2/1976 | Arimura et al. | 152/517 |
| 4,282,918 | 8/1981 | Tomoda et al. | 152/510 |
| 4,553,579 | 11/1985 | Matsumoto et al. | 152/510 |
| 5,131,445 | 7/1992 | Tokieda et al. | 152/517 |

FOREIGN PATENT DOCUMENTS

| | | | |
|---|---|---|---|
| 2623753 | 6/1989 | European Pat. Off. | |
| 0371755 | 6/1990 | European Pat. Off. | 152/555 |
| 0385192 | 9/1990 | European Pat. Off. | |
| 2926159 | 1/1980 | Fed. Rep. of Germany | |
| 2249778 | 5/1975 | France | |
| 2268657 | 11/1975 | France | |
| 0114606 | 9/1980 | Japan | 152/517 |
| 0041207 | 2/1988 | Japan | 152/555 |
| 3082801 | 4/1988 | Japan | 152/510 |
| 0141809 | 6/1988 | Japan | 152/522 |
| 0297306 | 11/1989 | Japan | 152/555 |
| 2234812 | 9/1990 | Japan | 152/555 |
| 1190766 | 5/1970 | United Kingdom | 152/454 |
| 2033316 | 5/1980 | United Kingdom | |
| 2053815 | 2/1981 | United Kingdom | |
| 2096949 | 10/1982 | United Kingdom | 152/510 |

Primary Examiner—Geoffrey L. Knable
Assistant Examiner—Nancy Krawczyk
Attorney, Agent, or Firm—Bruce J. Hendricks

[57] ABSTRACT

The present invention relates to a radial pneumatic tire having a contoured zone located in each of the sidewalls of the tire. The contoured zone improves the sidewalls ply durability and decreases upper sidewall circumferential ply-wire breakage, also known as zipper-break. More particularly, the radial pneumatic tire comprises (1) at least one circumferential reinforcing belt; (2) a pair of sidewalls extending from opposing edges of said reinforcing belt to corresponding tire beads and containing a single reinforcing cord ply that wraps around each bead and having two terminal ends; (3) an inner cavity; (4) a contoured zone, wherein said contoured zone is (a) located between said single reinforcing cord ply and said inner cavity, (b) is circumferentially extending about the axis of the tire, (c) located in a region of each sidewall defined by the area from said reinforcing belt to the terminal ends of said single reinforcing cord ply, and (d) wherein the distance between the single reinforcing cord ply and said inner cavity is greater in the region where the contoured zone is located in comparison to the distance between the single reinforcing cord ply and said inner cavity in the region beneath said reinforcing belt.

4 Claims, 2 Drawing Sheets

RADIAL PNEUMATIC TIRE HAVING CONTOURED ZONES IN THE SIDEWALLS

BACKGROUND OF THE INVENTION

The present invention relates to a pneumatic tire having a contoured zone in each sidewall. Pneumatic tires are laminated mechanical devices of generally toroidal shape having beads and a tread. In particular, the pneumatic tire of the present invention is a radial-ply tire. The term "radial-ply" tire is intended to include a belted or circumferentially restricted pneumatic tire in which the ply cords which extend from bead to bead are laid at cord angles between 65° and 90° with respect to the equatorial plane of the tire.

Radial truck tires are prone to have circumferential ply-breaks in the ply sidewall region under certain operation conditions. Such conditions include a dual tire running at zero or low inflation pressures while the tire is being used as one of a tandem set of tires, typically on a 18 wheeled vehicle. While this is not the recommended mode of usage of the tire, it is a rather common practice. This situation weakens the ply to the extent of breakage, or causes a loss in fatigue resistance and/or ultimate strength in the ply at the sidewalls so that blow-out may occur upon subsequent re-inflation of the tire. Therefore, there exists a need to compensate for this common but unrecommended occurrence in radial tires.

SUMMARY OF THE INVENTION

The present invention relates to a radial pneumatic tire comprising (1) at least one circumferential reinforcing belt; (2) a pair of sidewalls extending from opposing edges of said reinforcing belt to corresponding tire beads and containing a single reinforcing cord ply with a turn-up portion around each bead and having respective terminal ends; (3) an inner cavity; (4) a contoured zone, wherein said contoured zone is (a) located between said single reinforcing cord ply and said inner cavity, (b) circumferentially extending about the axis of the tire, (c) located in a region of each sidewall defined by the area from said outer edge of said reinforcing belt to the terminal ends of said single reinforcing cord ply, and (d) wherein the distance between the single reinforcing cord ply and said inner cavity is greater in the region where the contoured zone is located in comparison to the distance between the single reinforcing cord ply and said inner cavity in the region beneath said reinforcing belt.

BRIEF DESCRIPTION OF THE DRAWINGS

The invention will be described by way of example and with reference to the accompanying drawings in which.

DESCRIPTION OF THE PREFERRED EMBODIMENT

Figure 1:
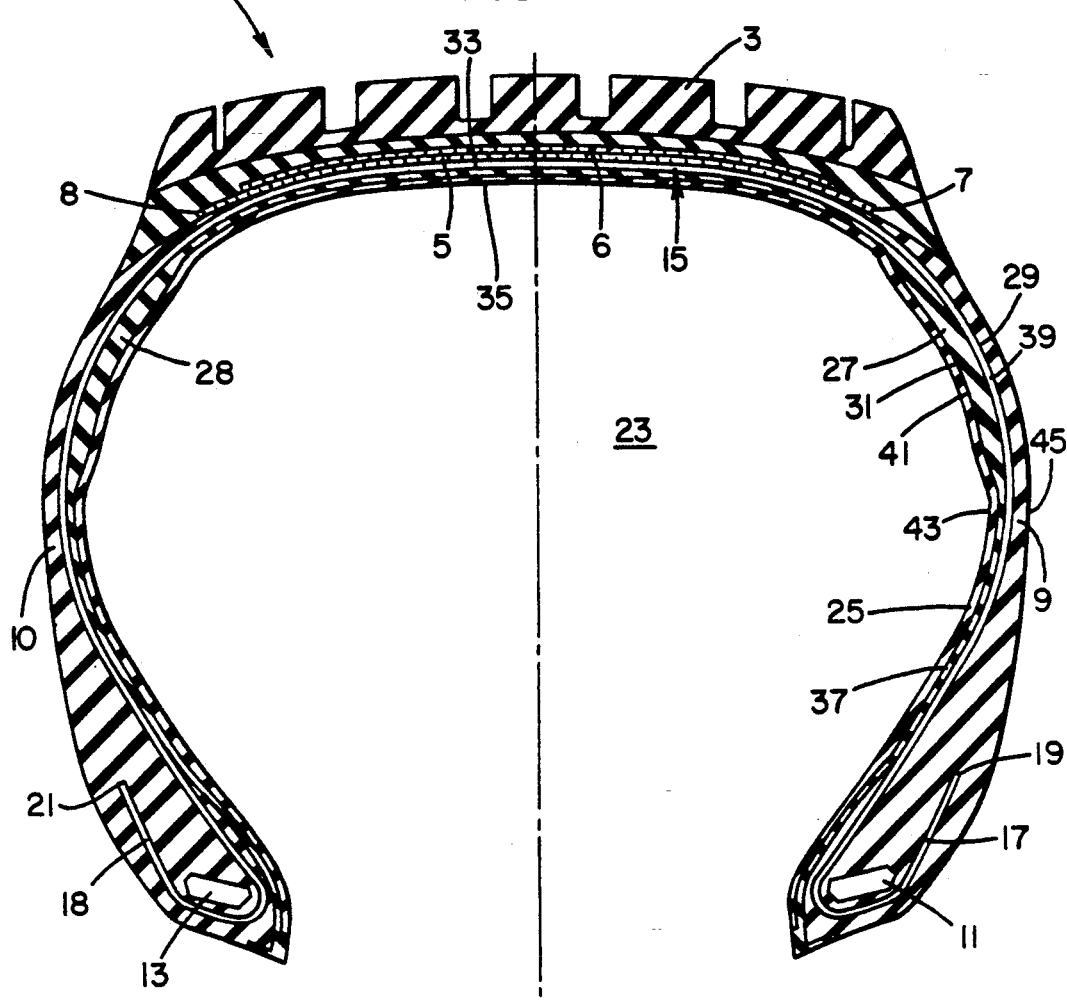
FIG. 1 is a cross-sectional view of a tire according to one aspect of the present invention.

A presently preferred embodiment of this invention is shown in FIG. 1 of the drawings. The radial pneumatic tire 1 has a tread 3 and at least one circumferentially reinforcing belt 5, 6. The pneumatic tire has a pair of sidewalls 9, 10 which extend from opposing outer edges 7, 8 of the reinforcing belt 5 to corresponding tire beads 11, 13. The pneumatic tire contains a single reinforcing cord ply 15 with two turn-up portions 17 and 18 and having two terminal ends 19, 21. The inner cavity 23 defines the inner profile of the tire 1. While a tire innerliner is not required, a tire innerliner 25 serves as an interphase between the inner cavity 23 and the contoured zone 27, 28. Each contoured zone 27, 28 is located between the single reinforcing cord ply 15 and the inner cavity 23. In those instances where a tire innerliner 25 is used, each contoured zone 27, 28 is located between the single reinforcing cord ply 15 and the innerliner 25. The contoured zone 27, 28 is circumferentially extending about the axis of the tire 1. The contoured zone 27, 28 is located in a region of each sidewall 9, 10 defined by the area from the outer edges 7, 8 of the reinforcing belt 5 to the terminal ends 19, 21 of the single reinforcing cord ply 15.

The distance between the single reinforcing cord ply 15 and the inner cavity 23 is greater in the region where the contoured zone 27, 28 is located in comparison to the distance between the single reinforcing cord ply 15 and the inner cavity 23 beneath the reinforcing belt 5. The distance between the single reinforcing cord ply 15 and the inner cavity 23 in the region where a contoured zone 27 is located can be seen between points 29 and 31. In comparison, the distance between the reinforcing cord ply 15 and the inner cavity 23 underneath the reinforcing belt 5 can be seen between points 33 and 35.

According to the embodiment shown in FIG. 1, the contoured zones 27, 28 are part of a barrier layer 37 which runs along the profile of the single reinforcing cord ply 15 and the inner cavity 23. In the case where an innerliner 25 is present (as shown in FIG. 1), the barrier layer 37 will be located between the innerliner 25 and the single reinforcing cord ply 15.

In a preferred embodiment, each contoured zone 27, 28 is located in the region starting at the outer edge 7, 8 of the reinforcing belt 5 and ending at approximately 60 percent of the distance along the ply contour between the outer edge 7, 8 of the reinforcing belt 5 and the terminal end of 19, 21 of the reinforcing cord ply 15. In a particularly preferred mode, each contoured zone 27, 28 is located in the region of from about 10 percent to about 50 percent of the distance along the ply contour starting from the outer edge 7, 8 of the reinforcing belt 5 and ending at the terminal end 19, 21 of the single reinforcing cord ply 15.

While the thickness of the contoured zone 27, 28 may vary, generally speaking the thickness will range from about 10 to about 30 percent of the overall thickness of the sidewall 9, 10 including the contoured zone 27, 28. As can be seen in FIG. 1, the distance between points 39 and 41 will range from about 15 to about 50 percent of the overall thickness of the thinnest portion of the sidewall 9 as seen between points 43 and 45.

The contoured zone 27, 28 may be formed from a variety of elastomers and rubber additives. Generally speaking, the elastomeric compound should be compatible with all interfacing layers such as the reinforcing cord ply 15 and the innerliner 25, if used. Representative of the elastomers which may be used include natural rubber, synthetic cis-polybutadiene, styrene butadiene rubber, high transpolybutadiene, butyl rubber, styrene-isoprene-butadiene rubber and the like. Conventional additives include carbon black, silica, antidegradants, zinc oxide, stearic acid, accelerators, processing and softening oils, sulfur, coupling agents and the like.

An example of a conventional compounds used for a radial truck tire body plus an innerliner which may be used to form the contour zones 27, 28 are provided in Vanderbilt Rubber Handbook edited by Robert O. Babbit, (Norwalk, Conn., R. T. Vanderbilt Company, Inc., 1990), page 608, 609, which is incorporated by reference in its entirety.

Figure 2:
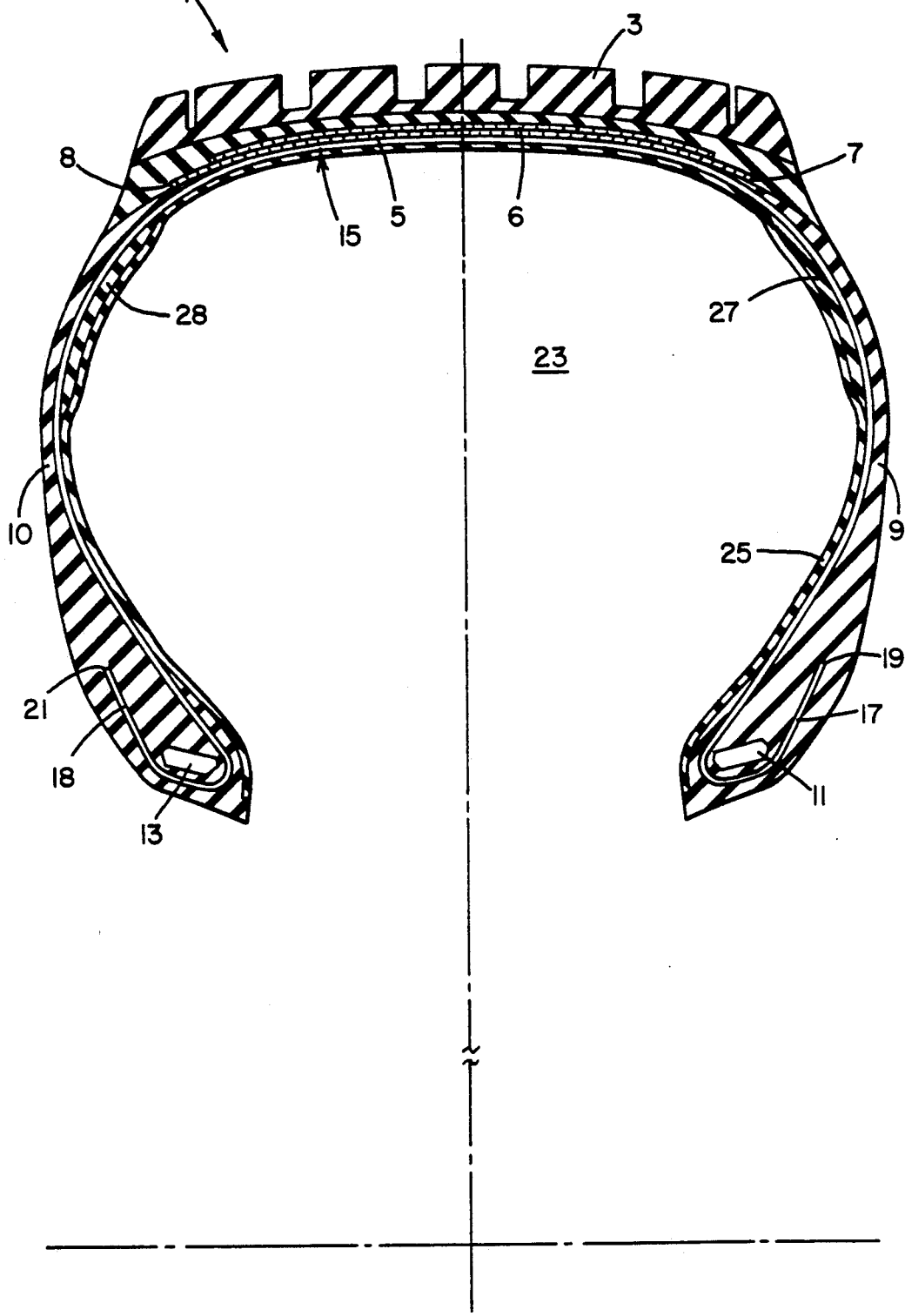
FIG. 2 is a cross-sectional view of a tire according to another aspect of the present invention.

FIG. 2 illustrates a second embodiment of the present invention. This embodiment has substantially the same construction of the tire of FIG. 1 except that the barrier layer 37 which incorporates the contour zone 27 has been eliminated. Instead, the contoured zones 27, 28 appears as gum strips located between the innerliner 25 and the single reinforcing cord ply 15.

What is claimed is:

1. A radial pneumatic tire comprising (1) at least one circumferential reinforcing belt; (2) a pair of sidewalls extending from opposing outer edges of said reinforcing belt to corresponding tire beads and containing a single reinforcing cord ply with a turn-up portion around each bead and having respective terminal ends; (3) an inner cavity; (4) a contoured zone, wherein said contoured zone is (a) located between said single reinforcing cord ply and said inner cavity, (b) circumferentially extending about the axis of the tire, (c) located in a region of from 10 to 50 percent of the distance along the ply contour starting from the outer edge of said reinforcing belt and ending at the terminal end of the single reinforcing cord ply and within this region the first end of said contoured zone terminates about 50 percent of the distance along the ply contour starting from the outer edge of the reinforcing belt and ending at the terminal end of the single reinforcing cord ply and the second end of said contoured zone terminates between the first end and 10 percent of the distance along the ply contour starting from the outer edge of said reinforcing belt and ending at the terminal end of the single reinforcing cord ply and (d) wherein a rubber gum strip is located in said contour zone such that the distance between the single reinforcing cord ply and said inner cavity is greater in said contoured zone in comparison to the distance between the single reinforcing cord ply and said inner cavity in the region beneath said reinforcing belt.

2. The radial pneumatic tire of claim 1 wherein the thickness of said contoured zone is from about 10 to about 30 percent of the overall thickness of the overall sidewall including the contoured zone.

3. The radial pneumatic tire of claim 1 wherein said tire additionally comprises an innerliner.

4. The radial pneumatic tire of claim 1 wherein the rubber gum is formed from an elastomer selected from the group consisting of natural rubber, synthetic cis-polybutadiene, styrene-butadiene rubber, high transpolybutadiene, butyl rubber, and styrene-isoprene-butadiene rubber.

* * * * *